United States Patent
Azaria et al.

(10) Patent No.: US 11,809,279 B2
(45) Date of Patent: Nov. 7, 2023

(54) AUTOMATIC IO STREAM TIMING DETERMINATION IN LIVE IMAGES

(71) Applicant: EMC IP Holding Company LLC, Hopkinton, MA (US)

(72) Inventors: Nadav Azaria, Beer Sheva (IL); Saar Cohen, Moshav Mishmeret (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 660 days.

(21) Appl. No.: 16/713,722

(22) Filed: Dec. 13, 2019

(65) Prior Publication Data

US 2021/0182150 A1    Jun. 17, 2021

(51) Int. Cl.
G06F 16/27 (2019.01)
G06F 16/28 (2019.01)
G06F 11/14 (2006.01)

(52) U.S. Cl.
CPC ........ *G06F 11/1446* (2013.01); *G06F 16/27* (2019.01); *G06F 16/285* (2019.01); *G06F 2201/84* (2013.01)

(58) Field of Classification Search
CPC .... G06F 11/1446; G06F 16/27; G06F 16/285; G06F 2201/84
See application file for complete search history.

(56) References Cited

U.S. PATENT DOCUMENTS

| | | | | |
|---|---|---|---|---|
| 8,224,781 B2* | 7/2012 | Popovski | ............ | G06F 11/1435 707/649 |
| 8,364,648 B1* | 1/2013 | Sim-Tang | ............... | G06F 16/20 707/674 |
| 8,782,003 B1* | 7/2014 | Patterson | ............ | G06F 16/1734 707/624 |
| 9,122,635 B1* | 9/2015 | Zhang | ................. | G06F 11/1451 |
| 2012/0166396 A1* | 6/2012 | Yamagami | .......... | G06F 11/1471 707/E17.007 |
| 2016/0019082 A1* | 1/2016 | Chandrasekaran | ......................... | G06F 9/45558 718/1 |
| 2018/0095816 A1* | 4/2018 | Fang | ..................... | G06F 11/079 |

* cited by examiner

*Primary Examiner* — Ken Hoang
(74) *Attorney, Agent, or Firm* — Workman Nydegger

(57) ABSTRACT

A live image of a virtual machine is disclosed. When generating a live image, an image of a virtual machine is generated. A journal is also generated that starts before a start time of the image and ends after the start time of the image. A live image is then generated by synchronizing the start time of the image with the journal. This includes evaluating or analyzing the journal relative to the backup to determine or synchronize the start time relative to the entries in the journal.

16 Claims, 5 Drawing Sheets

AUTOMATIC IO STREAM TIMING DETERMINATION IN LIVE IMAGES

FIELD OF THE INVENTION

Embodiments of the present invention generally relate to data protection operations. More particularly, at least some embodiments of the invention relate to systems, hardware, software, computer-readable media, and/or methods for performing data protection operations including synchronization and/or timing determination operations.

BACKGROUND

Data protection operations include backup operations where production data is backed up. There are various reasons for performing backup operations. The typical reason is to allow the production data to be recovered from the backups in the event of a problem with the production data.

Generating backups, however, can be a complicated process for many reasons. In addition to considering the configuration of the production data, backup operations also need to consider the types of applications and storage being used. Further, abstractions such as virtualization also add to the complexity of performing backup operations. Consequently, backup operations are not trivial tasks.

In one example of a backup operation, a virtual machine may be backed up by creating an image of the virtual machine. Generating an image of a virtual machine has many steps and, in order to be useful, the image must satisfy several requirements. If the image is not consistent, for example, the value of the image as a backup is substantially reduced and in many cases will make the image unusable. Further, it is often necessary to generate multiple images over time at least because production data is constantly being changed while it is backed up. Further, a consistent image may not represent a state of the application that enables the application to recover from the image. Multiple images may need to be generated to create an application consistent image. The process of generating valid backups is difficult.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
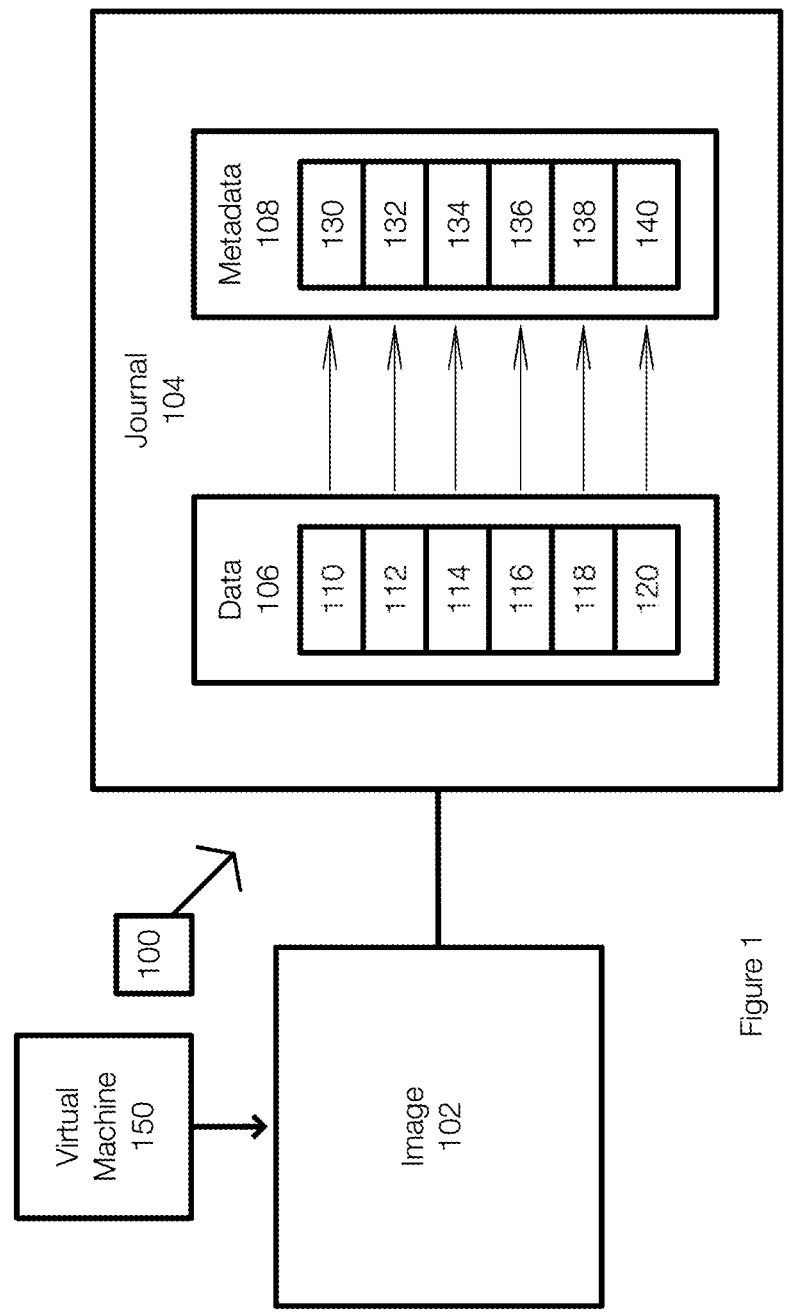
FIG. 1 illustrates an example of a live image generated in accordance with embodiments of the invention.

Embodiments of the present invention generally relate to data protection operations. More particularly, at least some embodiments of the invention relate to systems, hardware, software, computer-readable media, and methods for performing data protection operations. Data protection operations include, but are not limited to, backup operations, restore operations, deduplication operations, replication operations, journaling operations, timing determination operations, synchronization operations and the like or combination thereof.

In general, example embodiments of the invention relate to generating image-level backups of virtual machines. Embodiments of the invention further relate to live images including live virtual machine images and to generating live virtual machine images. A live virtual machine image, by way of example only, is an image of a virtual machine that is coupled with a journal. The journal may contain input/output (IO) operations near the time at which the image was taken. In other words, the backup or image is generated inside of a window of time associated with the journal.

Embodiments of the invention further relate to synchronization or timing determination operations that include determining a point in time at which a live virtual machine image was taken with respect to the journal. Embodiments of the invention allow a journal to be synchronized to a corresponding image without the complexity of requiring substantial timing requirements between the start of the journal and the point in time at which the image is taken. In one example, the timing determination can be performed after the backup is taken rather than performing the complex task of ensuring that the journal starts at the same time as the backup is taken.

As previously stated, a live virtual machine image is an image-level backup that includes a backup image coupled with a journal that logs IO operations or changes to the virtual machine or to data. Advantageously, live image level backups (images) can be generated without an agent operating on the virtual machine.

By associating the image with a journal, a virtual machine can be recovered at various points in time that are around the time at which the image was generated. This increases the probability of obtaining a recoverable image even if the image itself is not application consistent. The journal allows the live image to be rolled forward or backward in order to identify a useful image.

In one example, the data protection application may generate a backup using snapshots, clones, quiescing, and may even take down the application when generating a backup. A live image may require that IO to the virtual machine's volumes or disks be captured, for example in a journal. Embodiments of the invention, rather than performing a complex synchronization to ensure that the timing of the backup and the journal match as previously stated, find the place in the journal at which the backup or image was taken. Thus, the requirement of tight synchronization between the start of the journal and the start of the backup is avoided. In fact, embodiments of the invention allow the data protection operation (taking or generating image of a virtual machine) to be decoupled from the journal. Further, the backup and the journal can be performed by separate and independent systems.

Embodiments of the invention allow the journal to be analyzed to retrospectively synchronize or make a timing determination between the image and the journal. By evaluating the entries in the journal, the locations on the volume being protected, and/or values stored in the backup, the image and the journal can be synchronized after the fact. This simplifies the backup operation compared to synchronizing prior to performing the backup operation.

By way of example only and not limitation, a live image-level virtual machine backup (live image) taken at time t contains an image of each of the virtual machine's hard disks or volumes in one example. The live image may also include or be associated with a description of the hardware configuration of the virtual machine. The live image is also associated with a journal that stores IOs around the time of the backup.

The journal length may be determined by a parameter, which may be predefined. The journal length could also be defined using the amount of data generated by the application, the amount of time to wait after the backup was taken or initiated, or any other parameter that represents consistency requirements.

In one example, the journal may be implemented as an ordered list where each entry corresponds to an IO. By way of example only, each element or entry in the list may include or identify a write operation, metadata identifying the hard disk or volume of the virtual machine, an offset inside the disk (e.g., an LBA), and/or a length of the IO.

FIG. 1 illustrates an example of a live virtual machine image. The live image 100 includes an image 102 of a virtual machine (or of other data or volume or disk or data representation) and a journal 104. The journal 104 includes data 106 and metadata 108. Each of the data 110, 112, 114, 116, 118 and 120 correspond, respectively, to metadata 130, 132, 134, 136, 138 and 140. For example, the metadata 130 may identify the disk, offset, length of the data 110. Together, the data 110 and the metadata 130 represent an IO that occurred in the virtual machine that is the subject of the data protection operation. Multiple virtual machines can be protected simultaneously and each may be associated with its own live image.

The process of creating the live image 100 may include taking a backup image 102 of the production virtual machine 150 and capturing an IO stream to the virtual machine for a period of time to create the journal 104. The journal 104 represents a time segment or a period of time during which IOs are recorded.

The process of creating a live virtual machine Image includes taking a backup and capturing an IO stream for a time period (e.g., a few seconds) to create the journal. In this example, the journal 104 is initiated at a point in time prior to a start of generating the image 102. The journal 104 may be terminated at a point in time that is after the start time of generating the image 102. This ensures that the image 102 is taken sometime within the time period associated with the journal. As previously stated, the start of taking the image 102 and the start of the journal 104 do not need to be synchronized prior to starting the backup operation or in order to start the backup operation.

Embodiments of the invention allow the start time of the image 102 to be synchronized with the journal 104 by analyzing the journal 104, the backup, and/or the volume at a later point in time. In one example, the journal 104 is searched or analyzed to find the point in time in the journal 104 at which the image 102 was taken relative to the entries in the journal 104. As previously stated, embodiments of the invention can decouple the components that create the image 102 from the components that capture or create the journal 104. To perform a retroactive synchronization between the image 102 and the journal 104, the approximate time at which the image 102 is taken or will be taken is all that is needed in embodiments of the invention. More specifically, embodiments of the invention ensure that the journal 104 is started at a time (start time) prior to taking the image 102 and that the journal 104 terminates (end time) at a time after taking the image 102. The journal 104 can then be searched or analyzed to identify the start time of the image 102 relative to the journal 104.

For example, the process of generating a live image or a live virtual image may begin with a backup that is taken at time T. The journal 104 (e.g., a journal stream) is captured from a time period q before time T (e.g., a few seconds) to a time period p after time T or until a journal length is satisfied. For example, if the image is taken at time T, the journal 104 may start at q seconds before time T and end p seconds after time T. The time p may depend on the time required to fill the journal 104 or may be a predetermined time. Thus, the journal corresponds to a time segment (T−q, T+p).

The backup should be taken within this time segment and, in one embodiment, the backup should not start exactly on the boundaries of the time segment. By way of example, only, the parameters p and q can be on the order of seconds (e.g., q=about 5 seconds and p=about 30 seconds). Embodiments of the invention, however, are not limited to these periods.

In addition, the journal 104 may be ordered. More specifically, the data 106 and the metadata 108 may be ordered to correspond to the order in which the IOs occurred in the virtual machine 150. The journal 104 may be configured to keep write order fidelity.

Figure 2:
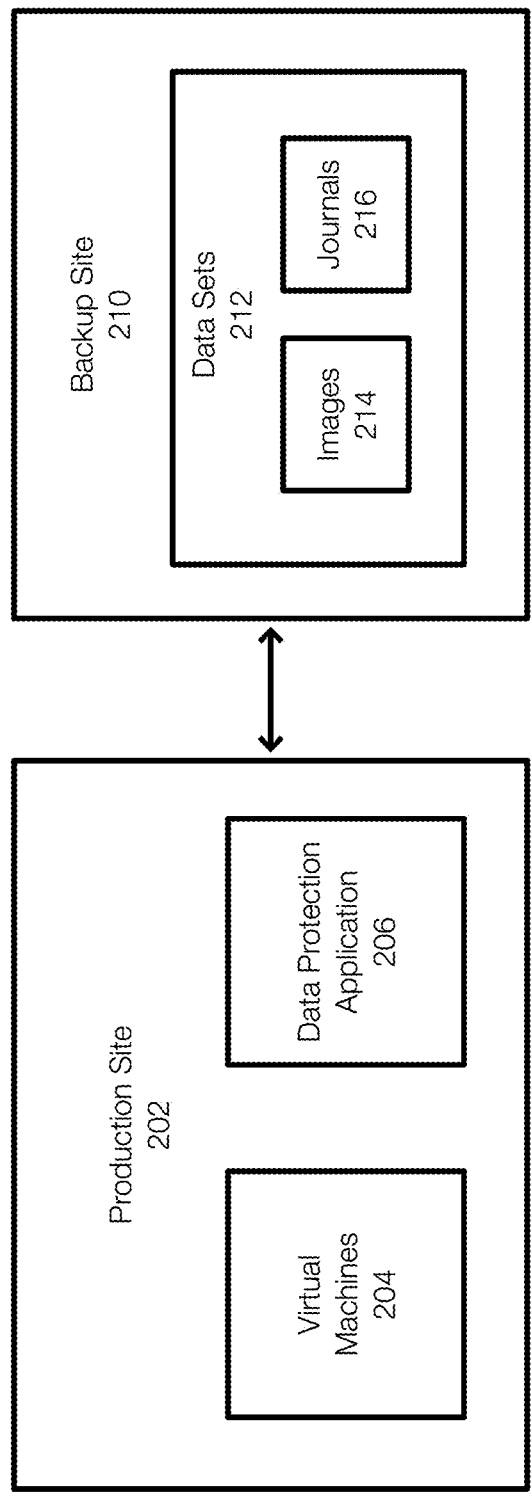
FIG. 2 illustrates an example of an environment in which live images are generated.

FIG. 2 illustrates an example of an environment in which data protection operations are performed. FIG. 2 illustrates a production site 202 and a backup site 210. The production site 202 may an on-premise computing system that includes hardware including processors, memory and other storage, network connections, clients, servers, applications, and the like. The production site 202 may be implemented in the cloud or locally, using virtual machines or other abstractions (e.g., containers). The backup site 210 may be on-premise or cloud based as well and may include hardware including processors, memory and other storage, and other circuitry and components. The backup site 210 may also be a virtualized or containerized environment.

The production site 202 may include virtual machines 204 that operate to perform tasks and other applications. A data protection application 206 may be configured to provide or perform data protection operations on the virtual machines 204. Thus, the data protection application 206 may generate data sets 212 that are stored at the backup site 210.

Live images are examples of data sets 212. Each virtual machine may be associated with multiple live images. The data sets 212 or live images may be full backups, incremental backups, or the like. In one example, the data sets 212 include images 214 that are associated with journals 216. Each image 214 is typically associated with a corresponding journal. The synchronization (and/or other data protection operations) between the images 214 and the journals 216 can be performed as the images are generated, after the images are generated, at the backup site, at the production site, or the like.

The data protection application 206 may be configured to trigger both the backup of the virtual machines 204 (or of any single virtual machine or other consistency group) and also trigger the corresponding journals at appropriate times.

This allows the data protection application 206 to generate live images that each include an image and an associated journal.

Figure 3:
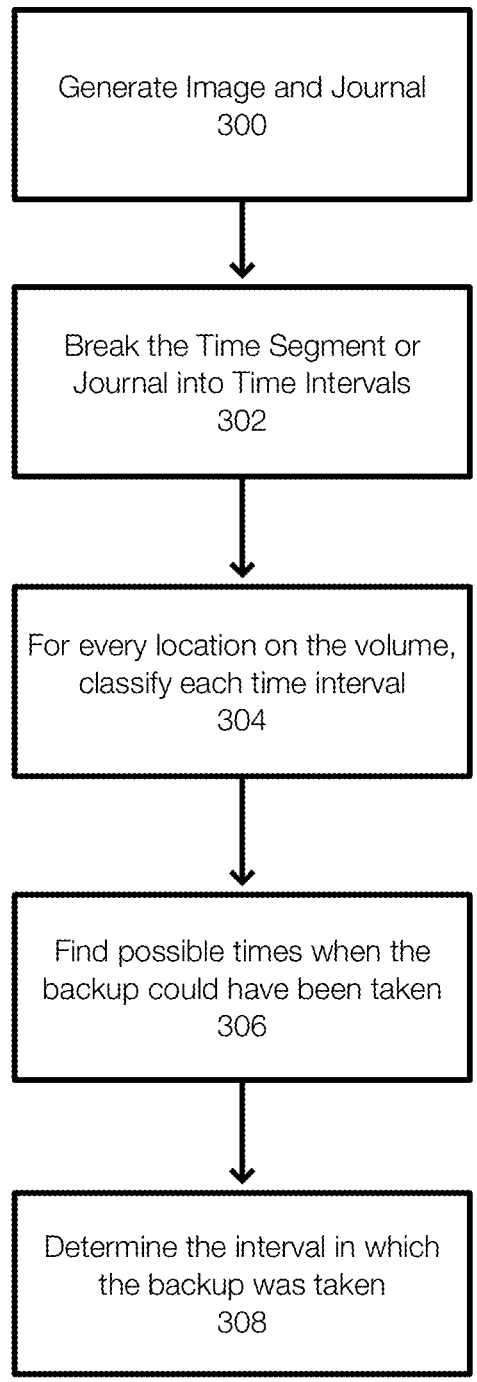
FIG. 3 illustrates an example method for performing data protection operations including the generation of a live image of a virtual machine.
Figure 4:
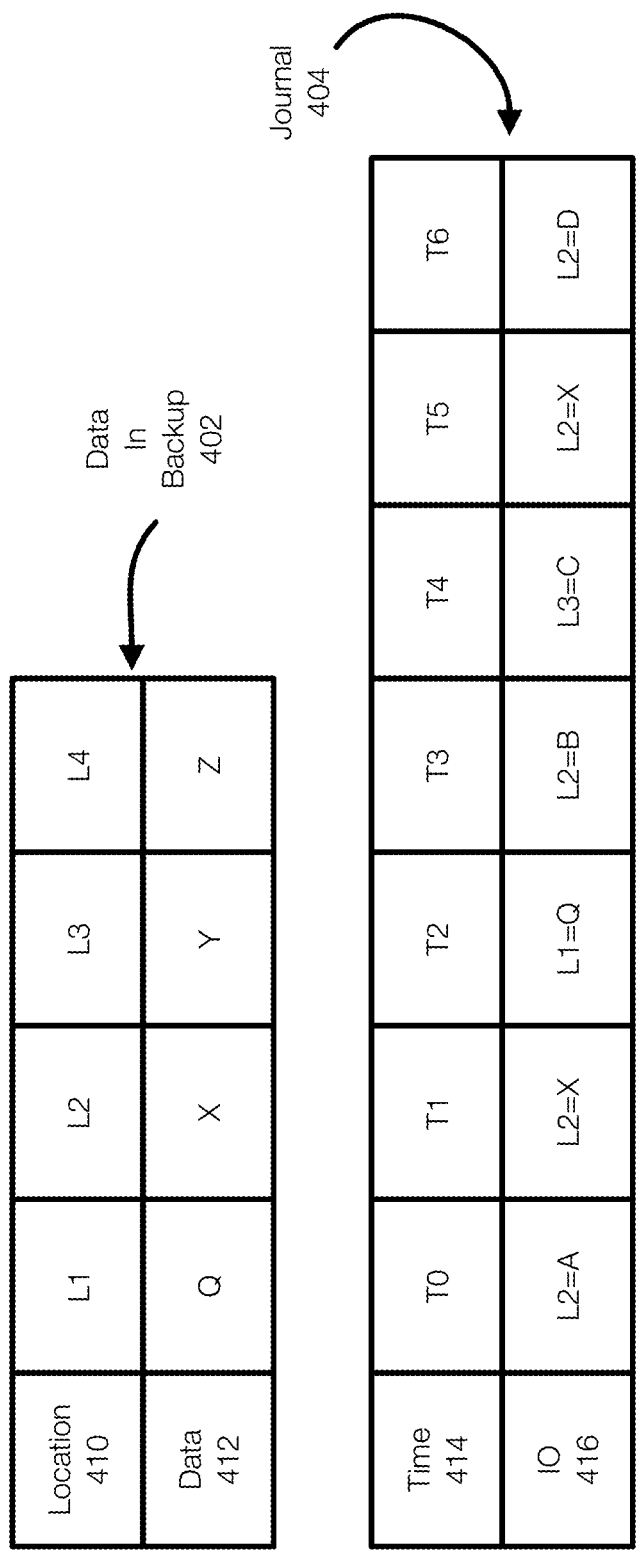
FIG. 4 illustrates an example of a journal and a backup associated with a data protection operation.
Figure 5:
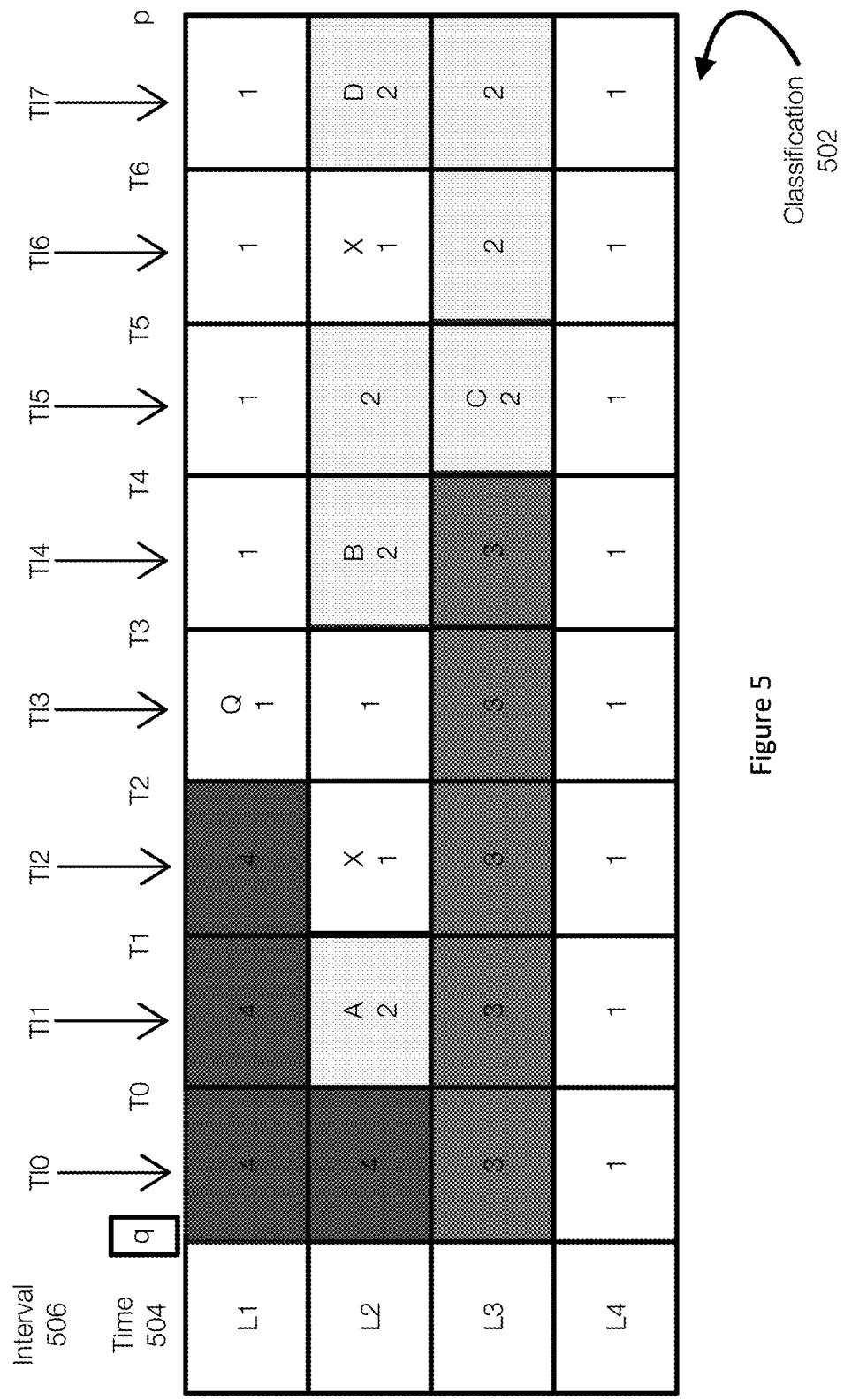
FIG. 5 illustrates an example of processing a backup in order to synchronize an image with a journal or to determine a timing of a backup operation relative to a journal.

FIGS. 3, 4, and 5 illustrate an example of a process for synchronizing an image with a journal. FIGS. 4 and 5 describe FIG. 3 in more detail.

FIG. 3 illustrates an example of a method for synchronizing an image with a journal to generate a live image. The method shown in FIG. 3 begins by generating 300 an image and a corresponding journal (this element may be omitted if the image and the journal already exist). This may include taking a backup of a virtual machine (of the virtual machine in its entirety, or its volumes, or the like) or other data set and generating a journal that is associated with the image. The journal is started before a time at which the backup is initiated and the journal ends at a time after the time at which the backup is taken or initiated.

Once the live image is generated, the live image can be processed. Initially, the journal, which corresponds to a time segment, is broken 302 into time intervals. The size of the intervals does not need to be constant and, in one example, each interval or time interval corresponds to an IO event recorded in the journal. Thus, the number of intervals may correspond to the number of entries in the journal.

Next, for each location L on the volume (e.g., the virtual hard disks) that were backed up, each time interval may be classified 304. The classification determines whether or not that time interval may be a time at which the backup was taken. In one example, it may only be necessary to evaluate the locations present in the journal at least because the other locations are presumed to be constant during the time segment corresponding to the journal.

Once all of the locations have been classified, the time intervals for all of the locations are evaluated to identify possible times when the backup could have been taken 306. More specifically, the classifications can be viewed holistically such that the start time of the backup relative to the journal can be determined. In one example, there may be more than one possible time at which the backup was taken. Finally, the time interval at which the backup was taken is selected 308.

The classification of the locations 304 may result in different classifications. In one example, the classification is performed from the perspective or viewpoint of a volume location. For example, location L, which maybe at a specific address (e.g., block 15), may contain data X in the backup or in the image. When analyzing the location L, there are (by way of example only and not limitation) three classifications or situations. The same considerations are applicable to all locations L in the volume. Consider the following situations:
1. There are no IOs in the journal for the location L.
2. There are IOs in the journal for L and the values are all different from the value X in the backup.
3. There are IOs in the journal for L and the values for some of the IOs in the journal are the value X.

If there are no IOs for the location L (situation or classification 1) in the journal, the location L has not changed during the time segment corresponding to the journal and can be ignored. Most locations in the volume fall in this situation because the time segment during which the journal tracks IOs is relatively small (e.g., about 30 seconds in one example).

If all IOs for L in the journal differ from value X in the backup (situation or classification 2), the backup must have been taken during a time interval prior to the time interval associated with the first IO for the location L in the journal.

In situation or classification 3, the backup may have been taken in or during any time interval after the value X has appeared and before the value was changed to something else. The backup may also have been taken before the first IO in the time interval. Before the first IO, no knowledge about the value of the location is available and the value may have been X or not.

As a result, looking at the time axis of (T−q, T+p) of the segment or of the journal, and splitting or breaking the time segment into intervals at every point there is an IO in the journal, each interval is in one of 4 states in one example:
1. The interval has the value X and may be when the backup was taken;
2. The interval has a value different from X and cannot be when the backup was taken;
3. Other (later) intervals do not have the value X and therefore it is concluded that the value was X and that this interval may possibly be when the backup was taken
4. It is unknown if this location contains X or not during this time interval.

FIGS. 4 and 5 illustrate an example of this process and illustrate the possible states of a few example volume locations.

FIG. 4 illustrates an example of an image or a backup and a journal, which together constitute an embodiment of a live image. FIG. 5 illustrates an example of correlating or synchronizing the image and the journal shown in FIG. 4.

FIG. 5 is coded numerically and using shading for discussion purposes. The codes or classifications in FIG. 5 is as follows:
1. Value matches the value in the backup. The interval can be when the backup was taken.
2. Value does not match the value in the backup. Interval cannot be when the backup was taken.
3. Value is concluded to match the value in the backup. Interval can be when backup was taken.
4. Value is unknown.

FIG. 4 illustrates data in the backup 402 (e.g., in the image of the virtual machine). More specifically, FIG. 4 illustrates the locations 410 and corresponding data 412 in the backup 402 in the locations 410.

In the backup 402, location L1 has data Q L2 has data X, L3 has data Y and L4 has data Z.

FIG. 4 also illustrates a journal 404, which includes a time 414 and an associated IO 416. The journal 404 begins at a time q and ends at a time p. The time at which the backup 402 was taken T falls in the time segment defined by q and p.

In the journal 404, L2 receives the value A at time T0, L2 receives the value X at time T1, L1 receives the value Q at time T2, L2 receives the value B at time T3, L3 receives the value C at time T4, L2 receives the value X at time T5 and L2 receives the value D at time T6. In other words, the journal 404 is a time ordered list of the IOs that occurred during a time segment associated with the backup operation. Because there are 7 entries in the journal 404 in this particular example, the journal 404 can be divided into 8 time intervals (TI) TI0-TI7 in this example. The time intervals could be defined and interpreted differently.

FIG. 5 illustrates the classifications of the locations L1-L4 in the intervals TI0-TI7 by analyzing the data in the backup 402 and the data in the journal 404. In this example, the time interval TI0 corresponds to a time q (start time of the journal) to a time T0. The time interval TI1 corresponds to a time period from T0 to T1. The other time intervals are similarly defined. At the end of the journal, the time interval TI7 corresponds to the interval between time T6 and time p (end time of journal) This process allows the time at which the backup was performed to be identified and allows the image to be synchronized to the journal.

The classification of the locations L1, L2, L3 and L4 are illustrated in FIG. 5 for each of the time intervals. The backup 402 contains the values of the locations L1, L2, L3, and L4 that existed in the volume (the virtual machine's hard disks) at the time of the backup.

With regard to the location L1, the journal 404 shows that the location L1 receives the IO Q at time T2. This is the only IO in the journal 404 for the location L1. Because the value of the location L1 in the backup is Q, any time from T2 and on is a possible solution. Thus, from the perspective of L1, the backup could have occurred at any time subsequent to time T2. In other words, the time interval during which the backup was started, from the perspective of location L1, is time intervals T13, T14, T15, T16 and T17

The value of location L1 prior to time T2 is not readily available. In fact, the location L1 may have had the value Q even before T2 (e.g., the same value was overwritten at time T2 in one example).

The classification 502 for the location L1 is a 4 (unknown) for the time intervals prior to interval TI3 (TI0, TI1 and TI2 in this example). The classification 502 for Location L1 after time T2 is 1, which indicates that the value of the location L1 matches the value in the backup. From the perspective of the location L1, the backup could have occurred in any of the time intervals classified with a 1.

The location L4 is analyzed next (the order in which the locations are analyzed can vary). The location L4 is not associated with any IOs in the journal 404. As a result, all time intervals receive a classification of 1 and the backup could have occurred in any of the time intervals in the journal 404 from the perspective of the location L4.

The location L3 is associated with one IO in the journal 404. At time T4, the location L3 receives a value C. However, the value of L3 in the backup is Y. Y is not equal to C. As a result, the value Y had to have been present in the volume from the beginning of the journal 404 (or the time segment associated with the journal 404) until time T4. The conclusion is that Y was present in the volume during this time intervals. In this case, the time intervals up to the time interval TI4 are concluded to have the value Y and are classified with a code of 3. The time intervals from TI5 and on (TI5, TI6 and TI7) are classified with a code 2, where the value of the location L3 in the journal does not match the value of the location L3 in the backup. As a result, the timer intervals from TI5 and on cannot be when the backup was taken.

The location L2 is associated with multiple IOs in the journal 404. By analyzing the journal entries for the location L2 and the value of the location L2 in the backup, the time intervals are classified as illustrated in FIG. 5. Before the time interval T0 (or the time interval T0) is coded with a 4 because the value is not readily known or is unknown. The interval from T0 to T1 (or the time interval TI1) is coded as a 2 (value does not match the backup) because the value of the location L2 at time T0 received A, which is not equal to the value X in the backup. At time T1, the location L2 receives the value X. Thus, the time interval TI2 (or between times T1 and T2) receives a classification of 1, indicating that the value matches the backup at time interval TI2. Using the classifications, the time intervals for the location L2 are classified: with a code or classification of 1 when the value matches the backup, with a code or classification of 2 when the value does not match the backup, a code or classification of 4 when the value is unknown, or a classification or code of 3 as described herein.

Once the time intervals are classified for all relevant locations, candidate time intervals can be identified. A candidate time interval is a time interval where the backup could have started for all locations. These candidate time intervals are the ones that may correspond to the start time of the backup. Identifying candidate time intervals and then selecting one of the candidate time intervals allows the backup to by synchronized with the journal.

In this example, the time interval TI3 after time T2 is a candidate time interval because the codes for all locations are all 1 or 3. However, it is also possible for the time interval TI2 after T1 or the time interval TI0 before T0 to be selected as candidate time intervals. Even if it cannot be proven that the backup start time was associated with these latter candidate time intervals (TI0 and TI2), there is nothing to contradict this assertion. Plus, the backup is guaranteed, in one embodiment, to be within the time segment associated with the journal and must start somewhere. It may therefore be possible to associate the start time with one or more candidates.

However, selecting one of the candidate time intervals or choosing a specific time interval to associated with the start time of the backup may be performed by evaluating the intersections of the locations at each time interval that does not include a classification or code of 2. For example, the interval TI1 is discarded and is not a candidate time interval because the location L2 has a classification of 2 during this time interval (the value in the journal does not match the value in the backup). A time interval that includes a location with a classification or code of 2 precludes that time interval from corresponding to the start time of the backup operation.

As previously discussed, the analysis shown in FIGS. 3-5 may result in the identification of candidate time intervals. In one example, more than one candidate time interval for when the backup may have been taken can occur when the data has changed and then changed back (e.g., 0→1→0→1→0). If the data in the backup was 1 then there may be more than one candidate interval.

However, embodiments of the invention ensure that at least one candidate time interval exists in the time segment of the journal. Further, all IOs in the journal keep write order fidelity as previously discussed and this helps ensure that the at least one candidate time interval can be identified.

Advantageously, if there is more than one candidate time interval, any one of the candidate intervals may be a correct or a suitable solution. Embodiments of the invention, however, may implement a selection order when multiple candidate time intervals are present. If a single time interval candidate is found, that time interval is selected as the time interval in which the backup started or was initiated. The following selection order may be applied:
1. If there is only one time interval where all of the intervals have a classification of 1 and/or 3, choose that time interval.
2. If there are more than one time interval where all of the intervals have a classification of 1 or of 1 and/or 3, choose the earliest time interval.
3. In none of the time intervals include only classifications of 1 and/or 3, chose the latest time interval that includes classifications of 1, 3 and/or 4.

In some embodiments, the backup operation may include an incremental backup operation. This may lead to a situation where locations are not part of the backup but are part of the journal. These situations may require access to the missing data at the time of the backup. This information can be accessed or provided from previous backups, using synthetic full previous backups (e.g., backups generated from a full backup plus one or more incremental backups), snapshotting the data at the time of the backup and granting access to the snapshot. Once the missing data is acquired, the method can proceed as previously discussed.

Embodiments of the invention describe the conditions and requirements to capture a live image of a virtual machine or other data set. The classification of the live image (e.g., of the locations of the volume as represented in the backup and the journal) is also discussed. The classification allows time intervals in a time segment (the journal) to be identified that may correspond to a start time of the backup. Thus a live image is generated by synchronizing the image with the journal. Further, embodiments of the invention allow a specific interval to be selected from multiple candidate intervals.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and/or unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such data protection operations may include, but are not limited to, data read/write/delete operations, data deduplication operations, data backup operations, data restore operations, data cloning operations, data archiving operations, disaster recovery operations, synchronization operations or the like or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms, and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Any one or more of the entities disclosed, or implied herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In the example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

Following are some further example embodiments of the invention. These are presented only by way of example and are not intended to limit the scope of the invention in any way.

Embodiment 1. A method for generating a live image of data, the method comprising identifying time intervals associated with a journal, wherein the journal is associated with an image of the data and wherein the journal includes entries associated with the data during a time period during which the image was taken, classifying every location in the journal impacted by the entries as a classified journal, identifying candidate time intervals from amongst the time intervals, wherein the image was generated during one of the candidate timer intervals; and synchronizing the journal with the image by selecting a synchronized time interval from amongst the candidate intervals as the time interval during which the image was taken.

Embodiment 2. The method of embodiment 1, further comprising starting the journal before a start time of taking the image.

Embodiment 3. The method of embodiment 1 and/or 2, further comprising ending the journal after an end time of the image.

Embodiment 4. The method of embodiment 1, 2 and/or 3, further comprising classifying every location in a volume associated with the virtual machine.

Embodiment 5. The method of embodiment 1, 2, 3, and/or 4, further comprising selecting the candidate time intervals, wherein a time interval is selected as a candidate time interval when all locations for associated with the time interval contain values equal to values in the image, are concluded to contain values equal to values in the image, or are unknown.

Embodiment 6. The method of embodiment 1, 2, 3, 4, and/or 5, further comprising selecting an earliest time interval when all locations contain locations that match the values in the backup.

Embodiment 7. The method of embodiment 1, 2, 3, 4, 5 and/or 6, further comprising selecting a latest time interval when the locations in the candidate time intervals do not all contain the value in the image.

Embodiment 8. The method of embodiment 1, 2, 3, 4, 5, 6 and/or 7, wherein the data comprises a virtual machine.

Embodiment 9. The method of embodiment 1, 2, 3, 4, 5, 6, 7, and/or 8, wherein the image is a partial image, further comprising accessing missing data from previous images or from a synthetic image, or from a snapshot of the image.

Embodiment 10. A non-transitory storage medium having stored therein instructions that are executable by one or more hardware processors to perform operations comprising identifying time intervals associated with a journal, wherein the journal is associated with an image of the data and wherein the journal includes entries associated with the data during a time period during which the image was taken, classifying every location in the journal impacted by the entries as a classified journal, identifying candidate time intervals from amongst the time intervals, wherein the image was generated during one of the candidate timer intervals, and synchronizing the journal with the image by selecting a synchronized time interval from amongst the candidate intervals as the time interval during which the image was taken.

Embodiment 11. The non-transitory storage medium of embodiment 10, the operations further comprising starting the journal before a start time of taking the image.

Embodiment 12. The non-transitory storage medium of embodiment 10 and/or 11, the operations further comprising ending the journal after an end time of the image.

Embodiment 13. The non-transitory storage medium of embodiment 10, 11 and/or 12, the operations further comprising classifying every location in a volume associated with the virtual machine.

Embodiment 14. The non-transitory storage medium of embodiment 10, 11, 12 and/or 13, the operations further comprising selecting the candidate time intervals, wherein a time interval is selected as a candidate time interval when all locations for associated with the time interval contain values equal to values in the image, are concluded to contain values equal to values in the image, or are unknown.

Embodiment 15. The non-transitory storage medium of embodiment 10, 11, 12, 13 and/or 14, the operations further comprising selecting an earliest time interval when all locations contain locations that match the values in the backup.

Embodiment 16. The non-transitory storage medium of embodiment 10, 11, 121, 13, and/or 15, the operations further comprising selecting a latest time interval when the locations in the candidate time intervals do not all contain the value in the image.

Embodiment 17. The non-transitory storage medium of embodiment 10, 11, 12, 13, 14, 15 and/or 16, wherein the data comprises a virtual machine.

Embodiment 18. The non-transitory storage medium of embodiment 10, 11, 12, 13, 14, 15, 16 and/or 17, wherein the image is a partial image, the operations further comprising accessing missing data from previous images or from a synthetic image, or from a snapshot of the image.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a live image of data, the method comprising:
    dividing a journal that begins prior to generating an image and that ends after generating the image into time intervals, wherein the live image includes the journal and an image of the data and wherein the journal includes entries associated with the data during a time period during which the image was taken;
    classifying every location in the journal impacted by the entries with a classification in each of the time intervals, wherein the classifications include a first classification indicates that a value in the journal matches a value in the image, a second classification where the value in the journal does not match the value in the image, a third classification indicating the value is concluded to match the value in the backup, and a fourth classification indicating that whether the value in the journal matches the value in the image is unknown;
    identifying candidate time intervals from amongst the time intervals based on the classifications of the locations in the time intervals, wherein the image was generated during one of the candidate timer intervals; and
    synchronizing the journal with the image by selecting a synchronized time interval from amongst the candidate intervals as the time interval during which the image was taken, wherein the classifications in the synchronized timer interval include only first and/or third classifications.

2. The method of claim 1, further comprising starting the journal before a start time of taking the image.

3. The method of claim 1, further comprising ending the journal after an end time of the image.

4. The method of claim 1, further comprising selecting the candidate time intervals, wherein a time interval is selected as a candidate time interval when all locations for associated with the time interval contain values equal to values in the image, are concluded to contain values equal to values in the image, or are unknown.

5. The method of claim 4, further comprising selecting an earliest time interval when all locations contain locations that match the values in the backup.

6. The method of claim 5, further comprising selecting a latest time interval when the locations in the candidate time intervals do not all contain the value in the image.

7. The method of claim 1, wherein the data comprises a virtual machine.

8. The method of claim 1, wherein the image is a partial image, further comprising accessing missing data from previous images or from a synthetic image, or from a snapshot of the image.

9. A non-transitory storage medium having stored therein instructions that are executable by one or more hardware processors to perform operations comprising:
- dividing a journal that begins prior to generating an image and that ends after generating the image into time intervals, wherein the live image includes the journal and an image of the data and wherein the journal includes entries associated with the data during a time period during which the image was taken;
- classifying every location in the journal impacted by the entries with a classification in each of the time intervals, wherein the classifications include a first classification indicates that a value in the journal matches a value in the image, a second classification where the value in the journal does not match the value in the image, a third classification indicating the value is concluded to match the value in the backup, and a fourth classification indicating that whether the value in the journal matches the value in the image is unknown;
- identifying candidate time intervals from amongst the time intervals based on the classifications of the locations in the time intervals, wherein the image was generated during one of the candidate timer intervals; and
- synchronizing the journal with the image by selecting a synchronized time interval from amongst the candidate intervals as the time interval during which the image was taken, wherein the classifications in the synchronized timer interval include only first and/or third classifications.

10. The non-transitory storage medium of claim 9, the operations further comprising starting the journal before a start time of taking the image.

11. The non-transitory storage medium of claim 9, the operations further comprising ending the journal after an end time of the image.

12. The non-transitory storage medium of claim 9, the operations further comprising selecting the candidate time intervals, wherein a time interval is selected as a candidate time interval when all locations for associated with the time interval contain values equal to values in the image, are concluded to contain values equal to values in the image, or are unknown.

13. The non-transitory storage medium of claim 12, the operations further comprising selecting an earliest time interval when all locations contain locations that match the values in the backup.

14. The non-transitory storage medium of claim 13, the operations further comprising selecting a latest time interval when the locations in the candidate time intervals do not all contain the value in the image.

15. The non-transitory storage medium of claim 9, wherein the data comprises a virtual machine.

16. The non-transitory storage medium of claim 9, wherein the image is a partial image, the operations further comprising accessing missing data from previous images or from a synthetic image, or from a snapshot of the image.

* * * * *